United States Patent
Eckstein et al.

(10) Patent No.: US 11,971,148 B1
(45) Date of Patent: *Apr. 30, 2024

(54) HIGH CONTRAST SOLID STATE ADAPTIVE HEADLIGHT

(71) Applicant: Atieva, Inc., Newark, CA (US)

(72) Inventors: Wiebke Eckstein, Woodside, CA (US); Hans-Christoph Eckstein, Woodside, CA (US)

(73) Assignee: Atieva, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,028

(22) Filed: Jun. 5, 2023

Related U.S. Application Data

(60) Provisional application No. 63/486,796, filed on Feb. 24, 2023, provisional application No. 63/382,777, filed on Nov. 8, 2022.

(51) Int. Cl.
| | |
|---|---|
| *F21S 41/275* | (2018.01) |
| *F21S 41/143* | (2018.01) |
| *F21S 41/20* | (2018.01) |
| *F21S 41/37* | (2018.01) |
| *F21Y 115/10* | (2016.01) |
| *G02B 27/30* | (2006.01) |

(52) U.S. Cl.
CPC .......... *F21S 41/275* (2018.01); *F21S 41/143* (2018.01); *F21S 41/285* (2018.01); *F21S 41/37* (2018.01); *F21Y 2115/10* (2016.08); *G02B 27/30* (2013.01)

(58) Field of Classification Search
CPC ........ F21S 41/275; F21S 41/37; F21S 41/143; F21S 41/285
See application file for complete search history.

(56) References Cited

U.S. PATENT DOCUMENTS

| | | |
|---|---|---|
| 6,155,694 A | 12/2000 | Lyons et al. |
| 7,515,357 B2 | 4/2009 | Segawa et al. |

(Continued)

FOREIGN PATENT DOCUMENTS

| | | |
|---|---|---|
| DE | 102018101991 B3 | 5/2019 |
| DE | 102020107926 A1 | 10/2021 |
| EP | 3502554 A1 | 6/2019 |

OTHER PUBLICATIONS

M. Sieler et al., Microoptical Array Projectors for Free-Form Screen Applications, Optics Express, vol. 21, No. 23, Nov. 18, 2013.

(Continued)

*Primary Examiner* — Christopher E Dunay
(74) *Attorney, Agent, or Firm* — Brake Hughes Bellermann

(57) ABSTRACT

A solid state headlight comprises: a light-emitting diode light source; an illumination micro-lens; a projection micro-lens; a collimating optic positioned between the light-emitting diode light source and the illumination micro-lens; a metal layer positioned between the illumination micro-lens and the projection micro-lens, the metal layer having an aperture; a high-reflectivity coating positioned between the metal layer and the illumination micro-lens, the high-reflectivity coating having a reflectivity of at least about 80%; and a low-reflectivity coating positioned between the metal layer and the projection micro-lens, the low-reflectivity coating having a reflectivity of at most about 20%.

20 Claims, 5 Drawing Sheets

(56) References Cited

U.S. PATENT DOCUMENTS

| | | | |
|---|---|---|---|
| 10,232,763 B1* | 3/2019 | Eckstein | G02B 19/0066 |
| 11,506,358 B2* | 11/2022 | Chen | G02B 19/0028 |
| 2011/0249460 A1 | 10/2011 | Kushimoto | |
| 2015/0003102 A1* | 1/2015 | Kong | G02B 6/0096 |
| | | | 362/551 |
| 2017/0203683 A1 | 7/2017 | Noronha et al. | |
| 2017/0234498 A1 | 8/2017 | Scheibner et al. | |
| 2017/0261173 A1 | 9/2017 | Suzuki | |
| 2017/0276311 A1 | 9/2017 | Hiki | |
| 2018/0165489 A1* | 6/2018 | McQueen | G06K 7/10831 |
| 2020/0088988 A1* | 3/2020 | Tanaka | G02B 19/0019 |
| 2021/0123578 A1* | 4/2021 | Schadenhofer | F21S 41/275 |
| 2021/0270437 A1* | 9/2021 | Ahn | F21S 43/245 |
| 2022/0057064 A1 | 2/2022 | Fischer et al. | |

OTHER PUBLICATIONS

International Search Report and Written Opinion for PCT Application No. PCT/US2023/078800, mailed on Feb. 8, 2024, 15 pages.

\* cited by examiner

HIGH CONTRAST SOLID STATE ADAPTIVE HEADLIGHT

CROSS-REFERENCE TO RELATED APPLICATION

This application claims benefit, under 35 U.S.C. § 119, of U.S. Provisional Patent Application No. 63/382,777, filed on Nov. 8, 2022, entitled "HIGH CONTRAST SOLID STATE ADAPTIVE HEADLIGHT", and also claims the benefit of U.S. Provisional Patent Application No. 63/486,796, filed on Feb. 24, 2023, entitled "HIGH CONTRAST SOLID STATE ADAPTIVE HEADLIGHT," the disclosures of both of which are incorporated by reference herein in their entireties.

TECHNICAL FIELD

This document relates to a high contrast solid state adaptive headlight.

BACKGROUND

A variety of techniques have been used in the past for controlling the light distribution from vehicle headlights. Some of the most advanced prior approaches have involved solid state headlights. While such approaches provided certain advantages over earlier techniques, they can generate stray light and/or glare in the light distribution, and can be associated with overheating or delamination.

SUMMARY

In an aspect, a solid state headlight comprises: a light-emitting diode light source; an illumination micro-lens; a projection micro-lens; a collimating optic positioned between the light-emitting diode light source and the illumination micro-lens; a metal layer positioned between the illumination micro-lens and the projection micro-lens, the metal layer having an aperture; a high-reflectivity coating positioned between the metal layer and the illumination micro-lens, the high-reflectivity coating having a reflectivity of at least about 80%; and a low-reflectivity coating positioned between the metal layer and the projection micro-lens, the low-reflectivity coating having a reflectivity of at most about 20%.

Implementations can include any or all of the following features. The illumination micro-lens comprises a single layer of polymer or glass material. The illumination micro-lens comprises a polymer or glass layer facing the collimation optic, and a polymer layer between the polymer or glass layer and the high-reflectivity coating. The illumination micro-lens comprises a first polymer layer facing the collimating optic, and a glass or polymer layer between the first polymer layer and the high-reflectivity coating. The solid state headlight further comprises a second polymer layer between the high-reflectivity coating and the glass layer. The projection micro-lens comprises a single layer of polymer or glass material. The projection micro-lens comprises a polymer, and a glass layer between the polymer and the low-reflectivity coating. The high-reflectivity coating comprises multiple layers. The low-reflectivity coating comprises multiple layers. The high-reflectivity coating has a reflectivity of at least about 90%. The low-reflectivity coating has a reflectivity of at most about 5%. The solid state headlight has a single channel. The solid state headlight has multiple channels, wherein the illumination micro-lens is included in a illumination micro-lens array, and wherein the projection micro-lens is included in a projection micro-lens array. The high-reflectivity coating includes a metallic coating, or a dielectric coating, or a combination thereof. The low-reflectivity coating includes a metallic coating, or a dielectric coating, or a combination thereof.

BRIEF DESCRIPTION OF DRAWINGS

Like reference symbols in the various drawings indicate like elements.

DETAILED DESCRIPTION

This document describes examples of systems and techniques for improving solid state adaptive headlights to improve the contrast of the range module and to reduce stray light to reduce glare. In some implementations, the metal aperture layer of a solid state adaptive headlight can be provided with a high-reflectivity dielectric/metallic coating facing the illumination side, and can be provided with a low-reflectivity coating (e.g., a metallic coating or a combination of a metallic and a dielectric coating, where a dielectric coating can be one layer or a layer stack of different dielectric coating materials) facing the projection side. This can reduce the heat accumulation in the illumination side, and can reduce stray light in the projection side, thereby lowering the amount of glare. As such, having at least one coating on each of the opposite sides of a metal aperture layer tunes reflection generated by the headlight and improves performance.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons.

Examples described herein refer to a top, bottom, front, side, or rear. These and similar expressions identify things or aspects in a relative way based on an express or arbitrary notion of perspective. That is, these terms are illustrative only, used for purposes of explanation, and do not necessarily indicate the only possible position, direction, and so on.

Figure 1:
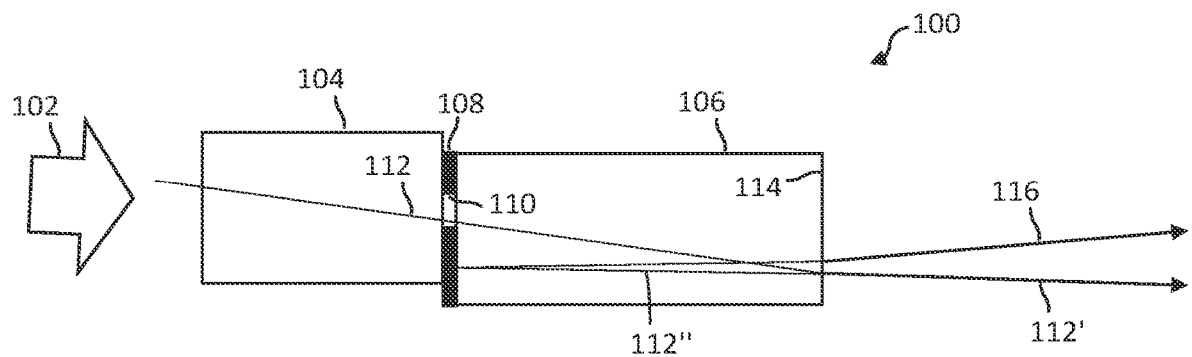
FIG. 1 shows an example of a channel for a high contrast solid state adaptive headlight.

FIG. 1 shows an example of a channel 100 for a high contrast solid state adaptive headlight. The channel 100 can be used with one or more other examples described elsewhere herein. In short, the channel 100 illustrates an example where a solid state headlight according to the present disclosure can include a single channel.

The channel 100 operates using collimated light 102, here schematically represented as an arrow of light impinging on the channel 100. The collimated light 102 may have been generated by one or more light sources, including but not limited to one or more light-emitting diode (LED) devices, and may have been collimated using one or more collimating optics devices.

The channel 100 includes an illumination lens 104 and a projection lens 106, with a metal aperture stack 108 between them. The metal aperture stack 108 is intended to avoid transmission of some light and includes at least one aperture 110. The metal aperture stack 108 provides increased reflectivity toward the illumination lens 104 and reduced reflectivity toward the projection lens 106. This can provide advantages, for example as will now be described.

The channel 100 can have improved operability and durability. In some implementations, a high reflectivity side of the metal aperture stack 108 can reduce absorption and thereby reduce degradation of the channel 100 (e.g., by avoiding de-lamination or overheating). For example, light 112 of the collimated light 102 passes through the aperture 110, and any remainder of the collimated light 102 can be substantially reflected by the metal aperture stack 108. That is, rather than light being absorbed at the metal aperture stack 108, from which heat escape may be only through thermal conduction, the light can be reflected back toward the source of the collimated light 102 where a heat sink can be placed.

The channel 100 can avoid stray light and thereby reduce glare. In some implementations, a low reflectivity side of the metal aperture stack 108 can prevent reflection of light. For example, light 112' exits the projection lens 106 as the light 112 impinges on an end 114. If light 112" is backscattered and reflected (due to Fresnel reflection) at the end 114, it could be reflected at the metal aperture stack 108 and exit the channel 100 as stray light 116. For example, backscattering can occur as a result of the material or surface of the projection lens 106, or due to the presence of dust or impurities or surface roughness. The stray light 116 may have a different direction than the light 112' and therefore give rise to glare from the channel 100. However, the low reflectivity side of the metal aperture stack 108 can reduce or eliminate the occurrence of the stray light 116 and can therefore improve the contrast in the light 112'.

Figure 2:
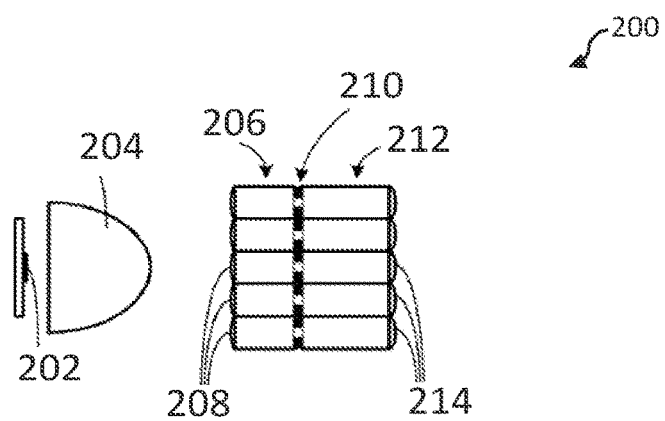
FIG. 2 shows an example of a schematic setup of a high contrast solid state adaptive headlight.

FIG. 2 shows an example of a schematic setup of a high contrast solid state adaptive headlight 200. The headlight 200 can be used with one or more other examples described elsewhere herein. In short, the headlight 200 illustrates an example where a solid state headlight according to the present disclosure can include multiple channels.

The headlight 200 includes a light source 202 such as, but not limited to, an LED array. The headlight 200 includes collimation optics 204. For example, the collimation optics 204 includes one or more optics elements that collimate incoming light, such as by reducing beam divergence. The headlight 200 includes an illumination micro-lens array (MLA) 206 with MLA lenslets 208 that pre-shape the intensity distribution of the light from the light source 202. The MLA lenslets 208 can include a one dimensional array (e.g., cylindrical lenses) or a two dimensional array of micro-lenses that may be identical to, or different from, each other. For example, the MLA lenslets 208 can all have the same shape, or can have different shapes. Except as otherwise indicated herein, the described MLA(s), and/or one or more other aspects of the headlight, can be construed in accordance with examples described in U.S. Pat. No. 10,232,763, the entire contents of which are incorporated herein by reference. The headlight 200 includes a metal aperture stack 210 to allow some of the light from the light source 202 to be transmitted, and to block a remainder of the light. The metal aperture stack 210 has a high-reflectivity coating facing toward the MLA lenslets 208. In some implementations, the high-reflectivity coating has a reflectivity of at least about 80%. For example, the reflectivity can be at least about 90%.

The headlight 200 includes a projection MLA 212 with MLA lenslets 214 that shape the intensity distribution of the light transmitted by the metal aperture stack 210. The MLA lenslets 214 can include an array of micro-lenses that may be identical to, or different from, each other. For example, the MLA lenslets 214 can all have the same shape, or can have different shapes. The metal aperture stack 210 has a low-reflectivity coating facing toward the MLA lenslets 214. In some implementations, the low-reflectivity coating has a reflectivity of at most about 20%. For example, the reflectivity can be at most about 5%.

The structure of the headlight 200 exemplified above, where the metal aperture stack 210 has respective high-reflectivity and low-reflectivity coatings, meets any of multiple process requirements that may apply to headlight design and its manufacture. For example, the headlight 200 satisfies the required performance criteria regarding structuring technologies (e.g., etching, ablation or lift off), adhesion, and oxygen diffusion (e.g., to avoid that the metal in the metal aperture stack 210 oxidizes). The headlamp can be designed so that most of the light goes through the opening (s) of the aperture stack. This can be realized by optimizing the collimator distribution and exit angle of the collimated light and by the MLA illumination lenslets 206.

Figure 3:
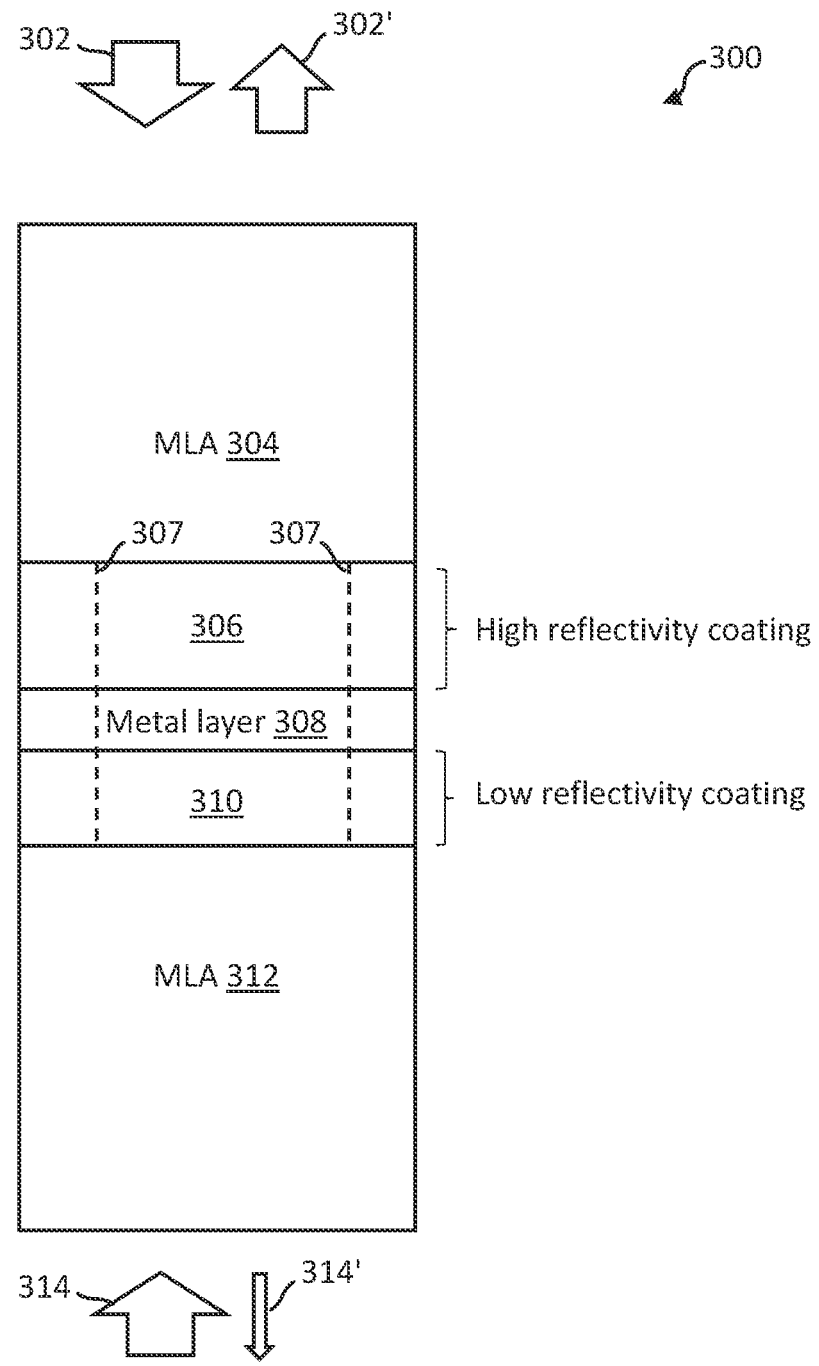
FIG. 3 shows an example of a stack for a high contrast solid state adaptive headlight.

FIG. 3 shows an example of a stack 300 for a high contrast solid state adaptive headlight. The stack 300 can be used with one or more other examples described elsewhere herein. The top of the stack 300 is designed to face toward a light source (e.g., providing collimated light from an LED array). Light 302 impinges on the stack 300 from the light source and is here schematically represented as an arrow. The stack 300 has an illumination MLA 304. In some implementations, the illumination MLA 304 comprises a layer of polymer (e.g., plastic or epoxy) and/or glass, the layer having lenslets. For example, the illumination MLA 304 can include lenslets of the same or different shapes/sizes as each other. The illumination MLA 304 is transparent and refractive. As such, the stack 300 can include an illumination micro-lens comprising a single layer of a polymer or glass material (e.g., a compression molded, or injection molded, etched, embossed, or imprinted lens array). In some implementations, the stack 300 can have an epoxy layer at the illumination MLA 304. When using, e.g., a plastic insert/over-molding, an adhesion/epoxy layer can be omitted; the stack 300 can have plastic lenses on both sides and the metal layer in the middle connected to each other. Gluing can lead to thickness deviations from the lenslets to the aperture, but in some implementations the illumination MLA 304 can be glued towards the projection side because the positioning requirements may be lower. The stack 300 has a high-reflectivity coating 306 facing (e.g., in contact with) the illumination MLA 304. The high-reflectivity coating 306 can include one or more layers and can have a thickness selected based on the wavelength(s) of the light 302. For example, the thickness of the high-reflectivity coating 306 can be about one half of the wavelength of the light 302. The high-reflectivity coating 306 can have a reflectivity of at least about 80%, such as at least about 90%. Due to the high-reflectivity coating 306, light 302' of the light 302 is reflected toward the illumination side in the area(s) where an aperture 307 is not present. The stack 300 has a metal layer 308 with one or more apertures including but not limited to the aperture 307 (i.e., where also the high-reflectivity coating 306 is not present) to allow some of the light 302 to be transmitted. The metal layer 308 (including or not including the high-reflectivity coating 306 and/or a low-reflectivity coating 310 to be described below) can be formed using any of multiple techniques that produce a relatively thin metal layer having apertures. In some implementations, the metal layer 308 (including or not including the high-reflectivity coating 306 and/or the low-reflectivity coating 310) is stamped from a metal sheet. As such, coating can be performed before or after stamping in some implementations.

The stack 300 has a low-reflectivity coating 310 at the metal layer 308 on an opposite side from the high-reflectivity coating 306. The low-reflectivity coating 310 can include one or more layers. The low-reflectivity coating 310 can be a dielectric or a metallic coating or a combination of both. For example, a base metallic layer with a high absorption coefficient and a single dielectric layer or a dielectric layer stack as antireflection coating can be used. The low-reflectivity coating 310 can have a thickness selected based on the wavelength(s) of the light 302. For example, a metal layer component of the low-reflectivity coating 310 can be about 50 nanometers (nm) or more for visible light and a dielectric layer component of the low-reflectivity coating 310 can be about one fourth of the wavelength of the light 302. The low-reflectivity coating 310 can have a reflectivity of at most about 20%, such as at most about 5%.

The stack 300 has a projection MLA 312. The projection MLA 312 can have essentially the same composition as, or a different composition from, the illumination MLA 304. In some implementations, the projection MLA 312 comprises a layer of polymer (e.g., plastic or epoxy) or glass, the layer having lenslets. For example, the projection MLA 312 can include lenslets of the same or different shapes/sizes as each other. As such, the stack 300 can include a projection micro-lens comprising a single layer of polymer or glass material (e.g., a compression molded, or injection molded, etched, embossed or imprinted, lens array). The metal layer 308 and the low-reflectivity coating 310 may be placed directly onto the projection MLA 312 (e.g., a polymer or glass material). Light 314 can travel through the projection MLA 312 toward the low-reflectivity coating 310. For example, the light 314 results from internal (Fresnel) back-reflection of the MLA lens or reflections/stray light coming from other components of the headlight where the stack 300 is used. Due to the low-reflectivity coating 310, light 314' of the light 314 is transmitted forward in the stack 300. The light 314' can be an insubstantial portion of the light 314, as schematically indicated by the relative thicknesses of the arrows. As illustrated in this example, the sizes of the lights 302 and 302', on the one hand, and the sizes of the lights 314 and 314', on the other hand, are not necessarily comparable to each other, or drawn to the same scale, or otherwise indicative of their relative amounts. As such, the present example shows that the amount of stray light can be decreased, thereby reducing glare from the headlight.

Figure 4:
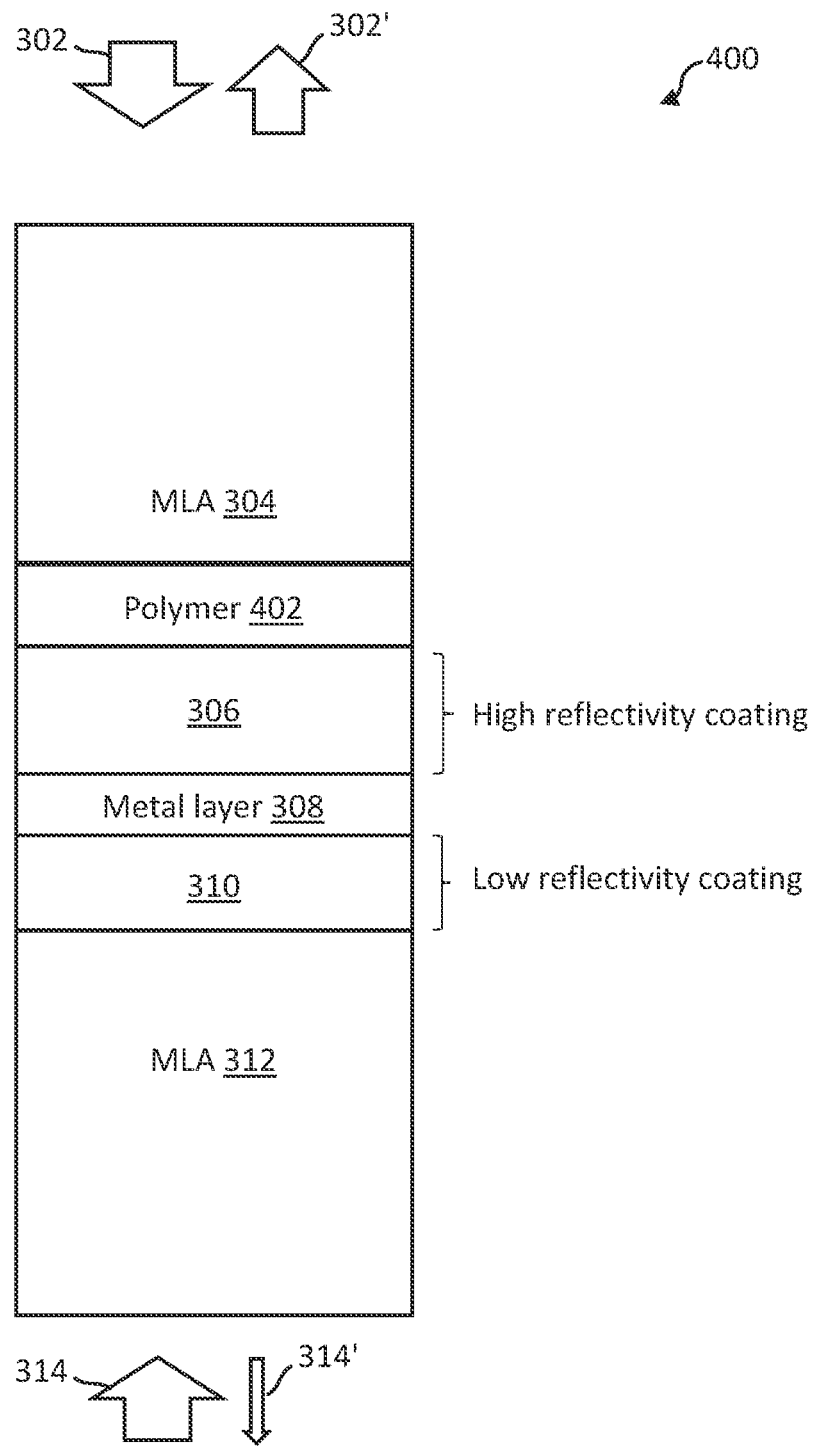
FIG. 4 shows another example of a stack for a high contrast solid state adaptive headlight.

FIG. 4 shows another example of a stack 400 for a high contrast solid state adaptive headlight. The stack 400 can be used with one or more other examples described elsewhere herein. Some aspects of the stack 400 can be similar or identical to those of the stack 300 (FIG. 3) and are not described in detail.

The stack 400 can include a polymer layer 402 (e.g., an adhesion layer) between the illumination MLA 304 and the high-reflectivity coating 306. In some implementations, the polymer layer 402 includes an epoxy material. For example, an acrylic polymer can be used. The metal layer 308 including or not including all or a part of the high-reflectivity coating 306 and/or the low-reflectivity coating 310 can be formed using any of multiple techniques that produce a relatively thin metal/dielectric layer having apertures. In some implementations, the metal layer 308 including or not including all or a part of the high-reflectivity coating 306 and/or the low-reflectivity coating 310 is formed by a wafer scale material deposition process (e.g., physical vapor deposition (PVD) or chemical vapor deposition (CVD)) in combination with a lithographic step (e.g., photolithography realizing a photo-resist pattern) in combination with an etching or lift-off process (transferring the resist pattern into the metal layer (including or not including all or part of the high-reflectivity coating 306 and/or the low-reflectivity coating 310)). As such, in some implementations, dielectric coatings can be created after metal coatings have been structured. For example, this can affect etching behavior. In some implementations, the metal layer 308 and the low-reflectivity coating 310 may be placed directly onto the projection MLA 312 (e.g., a polymer or glass material).

Figure 5:
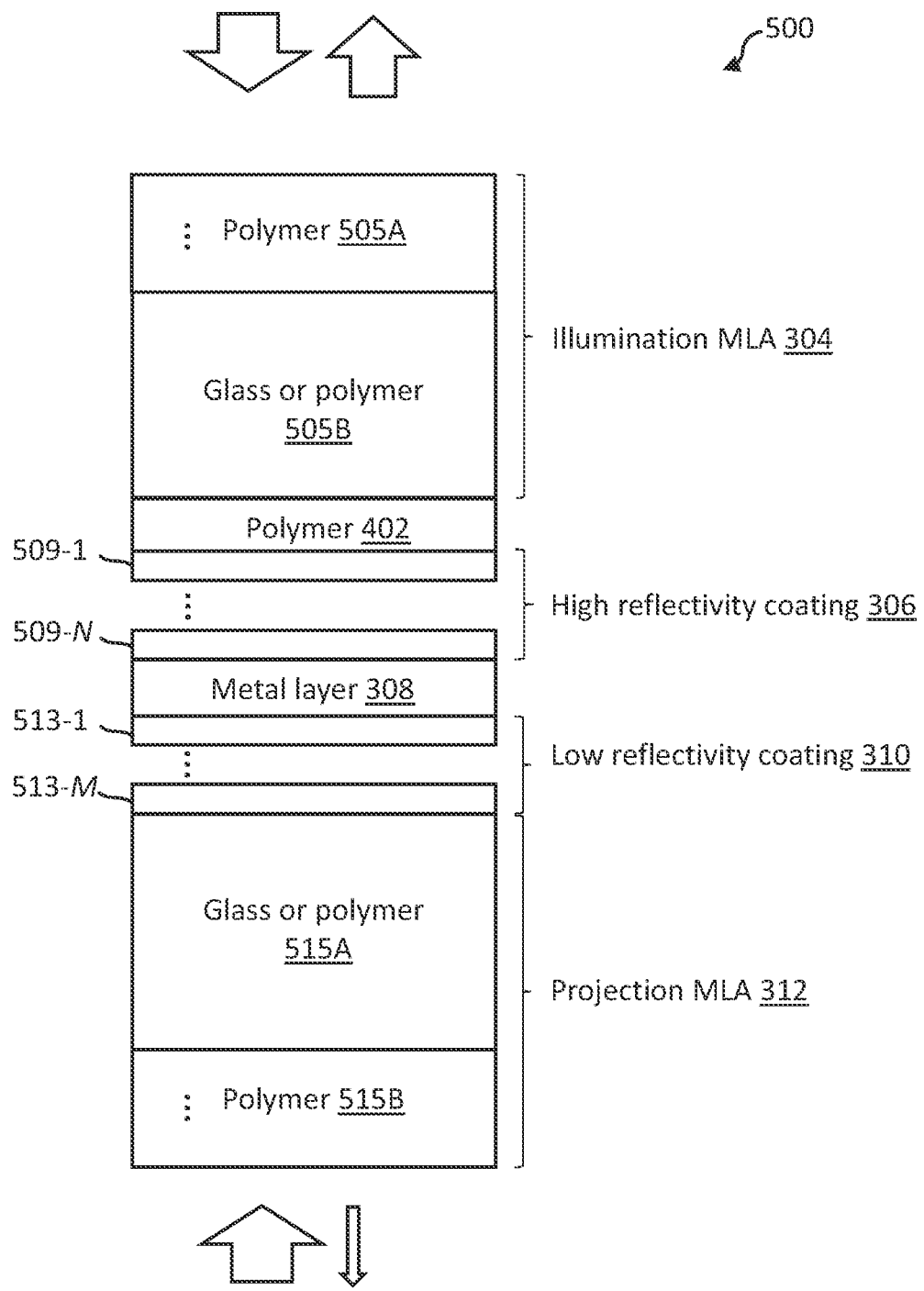
FIG. 5 shows another example of a stack for a high contrast solid state adaptive headlight.

FIG. 5 shows another example of a stack 500 for a high contrast solid state adaptive headlight. The stack 500 can be used with one or more other examples described elsewhere herein. For example, some features of the stack 500 can be similar or identical to those of the stack 400 in FIG. 4, and/or the stack 300 in FIG. 3. In the following, only some differences are discussed.

The illumination MLA 304 can include a polymer layer 505A and a glass or polymer layer 505B. In some implementations, the polymer layer 505A can face collimating optic. For example, the polymer layer 505A can include a plastic material (e.g., epoxy). The glass or polymer layer 505B is positioned between the polymer layer 505A and the metal layer 308, such as between the polymer layer 505A and the polymer layer 402. For example, lenslets can be formed in the polymer layer 505A (e.g., by imprint technology).

The high-reflectivity coating 306 can include multiple layers. Here, layers 509-1 through 509-N are shown, where N=2, 3, . . . . The layers 509-1 through 509-N can include the same materials as each other, or at least one of the layers 509-1 through 509-N can have a different material. The layers 509-1 through 509-N can have the same thickness as each other, or at least one of the layers 509-1 through 509-N can have a different thickness.

The low-reflectivity coating 310 can include multiple layers. Here, layers 513-1 through 513-M are shown, where M=2, 3, . . . . The layers 513-1 through 513-M can include the same materials as each other, or at least one of the layers 513-1 through 513-M can have a different material. The layers 513-1 through 513-M can have the same thickness as each other, or at least one of the layers 513-1 through 513-M can have a different thickness.

The projection MLA 312 can include a glass or polymer layer 515A and a polymer layer 515B. For example, the polymer layer 515B can include a plastic material (e.g., epoxy). The glass or polymer layer 515A can be placed adjacent the low-reflectivity coating 310. For example, lenslets can be formed in the polymer layer 515B.

Figure 6:
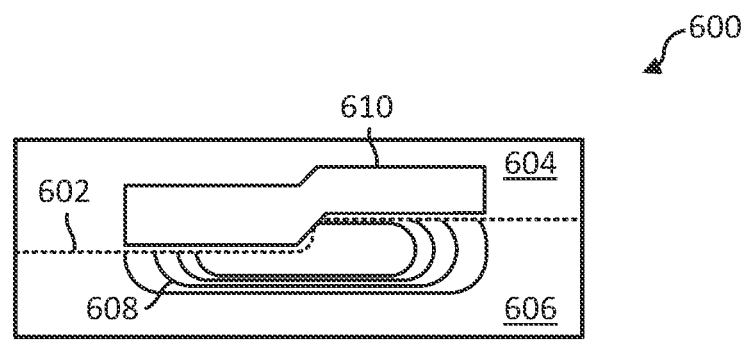
FIG. 6 shows an example of a light distribution for a high contrast solid state adaptive headlight.

FIG. 6 shows an example of a light distribution 600 for a high contrast solid state adaptive headlight. The light distribution 600 can be used with one or more other examples described elsewhere herein. For example, any headlight described herein can be designed to have the light distribution 600.

The light distribution 600 is in part characterized by a cutoff line 602 which divides the light distribution 600 into areas 604 and 606. In some implementations, the area 604 can be referred to as an upper area and the area 606 as a lower area. For example, automotive regulations can specify limit values for light intensity in the area 604. As such, a headlight designer might want to maximize the light intensity in the area 606 while not exceeding a maximum intensity in the area 604 (e.g., to maximize a contrast ratio between the areas 604 and 606, such as to 1:500 or to 1:200).

The light distribution 600 can be generated by one module of the headlight in one use case. The light distribution 600 includes one or more intensity areas 608 in the area 606. For example, the light intensity in one of the intensity areas 608 can be higher or lower than in one or more others of the light intensity areas 608. A potential glare area 610, by contrast, is located in the area 604 (that is, across the cutoff line 602 from the light intensity area(s) 608). As such, light in the potential glare area 610 may possibly result in glare for an oncoming motorist or pedestrian. In some implementations, light intensity in the potential glare area 610 should be minimized to comply with applicable regulations, without sacrificing light intensity in the light intensity area(s) 608. Headlights of the present subject matter can provide higher maximal values within the light intensity area(s) 608 while nevertheless maintaining an acceptably low level of stray light in the potential glare area 610.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A solid state headlight comprising:
a light-emitting diode light source;
an illumination micro-lens;
a projection micro-lens;
a collimating optic positioned between the light-emitting diode light source and the illumination micro-lens;
a metal layer positioned between the illumination micro-lens and the projection micro-lens, the metal layer having an aperture;
a high-reflectivity coating positioned between the metal layer and the illumination micro-lens, the high-reflectivity coating having a reflectivity of at least about 80%; and
a low-reflectivity coating positioned between the metal layer and the projection micro-lens, the low-reflectivity coating having a reflectivity of at most about 20%.

2. The solid state headlight of claim 1, wherein the illumination micro-lens comprises a single layer of polymer or glass material.

3. The solid state headlight of claim 1, wherein the illumination micro-lens comprises a polymer or glass layer facing the collimating optic, and a polymer layer between the polymer or glass layer and the high-reflectivity coating.

4. The solid state headlight of claim 1, wherein the illumination micro-lens comprises a first polymer layer facing the collimating optic, and a glass or polymer layer between the first polymer layer and the high-reflectivity coating.

5. The solid state headlight of claim 4, further comprising a second polymer layer between the high-reflectivity coating and the glass layer.

6. The solid state headlight of claim 1, wherein the projection micro-lens comprises a single layer of polymer or glass material.

7. The solid state headlight of claim 1, wherein the projection micro-lens comprises a polymer, and a glass layer between the polymer and the low-reflectivity coating.

8. The solid state headlight of claim 1, wherein the high-reflectivity coating comprises multiple layers.

9. The solid state headlight of claim 1, wherein the low-reflectivity coating comprises multiple layers.

10. The solid state headlight of claim 1, wherein the high-reflectivity coating has a reflectivity of at least about 90%.

11. The solid state headlight of claim 1, wherein the low-reflectivity coating has a reflectivity of at most about 5%.

12. The solid state headlight of claim 1, wherein the solid state headlight has a single channel.

13. The solid state headlight of claim 1, wherein the solid state headlight has multiple channels, wherein the illumination micro-lens is included in a illumination micro-lens array, and wherein the projection micro-lens is included in a projection micro-lens array.

14. The solid state headlight of claim 1, wherein the high-reflectivity coating includes a metallic coating, or a dielectric coating, or a combination thereof.

15. The solid state headlight of claim 1, wherein the low-reflectivity coating includes a metallic coating, or a dielectric coating, or a combination thereof.

16. The solid state headlight of claim 1, further comprising an illumination micro-lens array, wherein the illumination micro-lens is included in the illumination micro-lens array.

17. The solid state headlight of claim 16, wherein the illumination micro-lens array includes lenslets that pre-shape an intensity distribution of light from the light-emitting diode light source.

18. The solid state headlight of claim 1, further comprising a projection micro-lens array, wherein the projection micro-lens is included in the projection micro-lens array.

19. The solid state headlight of claim 18, wherein the projection micro-lens array includes lenslets that shape an intensity distribution of light transmitted by the aperture of the metal layer.

20. The solid state headlight of claim 1, wherein the light-emitting diode light source is configured to emit light, and wherein the high-reflectivity coating has a thickness that is about one half of a wavelength of the light.

* * * * *